(12) United States Patent
Mateju (10) Patent No.: US 10,809,508 B2
(45) Date of Patent: Oct. 20, 2020

(54) COLLIMATOR, ESPECIALLY FOR THE LIGHT DEVICE OF A VEHICLE, AND AN OPTICAL MODULE COMPRISING THE COLLIMATOR

(71) Applicant: Varroc Lighting Systems, s.r.o., Senov u Noveho Jicina (CZ)

(72) Inventor: Tomas Mateju, Bartosovice (CZ)

(73) Assignee: Varroc Lighting Systems s.r.o., Senov U Noveho (CZ)

( * ) Notice: Subject to any disclaimer, the term of this patent is extended or adjusted under 35 U.S.C. 154(b) by 0 days.

(21) Appl. No.: 16/210,593

(22) Filed: Dec. 5, 2018

(65) Prior Publication Data
US 2019/0170990 A1    Jun. 6, 2019

(30) Foreign Application Priority Data
Dec. 6, 2017    (CZ) .................................... 2017-783

(51) Int. Cl.
*G02B 19/00* (2006.01)
*F21S 43/239* (2018.01)
(Continued)

(52) U.S. Cl.
CPC .......... *G02B 19/0061* (2013.01); *F21S 41/24* (2018.01); *F21S 41/265* (2018.01);
(Continued)

(58) Field of Classification Search
CPC .......... F21S 43/239; F21S 43/20; F21S 41/24; F21S 41/285; G02B 19/0061; G02B 19/0019; G02B 6/002
See application file for complete search history.

(56) References Cited

U.S. PATENT DOCUMENTS 6,536,923 B1 * 3/2003 Merz .................... F21V 7/0091
                                                    362/327
7,207,700 B2    4/2007 Fallahi et al.
(Continued)

FOREIGN PATENT DOCUMENTS

CN      104765242 A    7/2015
GB      1321891         7/1973

OTHER PUBLICATIONS

Search Report from Corresponding Czech Application No. PV 2017-783 dated Aug. 15, 2018 (3 pages).

*Primary Examiner* — William N Harris
(74) *Attorney, Agent, or Firm* — Hovey Williams LLP (57) ABSTRACT

The collimator comprises an output area approximately having the shape of an n-gon with legs and apices, for collimation of light rays emitted by a light source. In viewing the collimator from the side from the optical source in the direction of the lighting axis, the collimator comprises n first parts and n second parts. Each first part is associated with one of the legs of the n-gon and comprises the first sector of the first circular collimator, approximately inscribed in the n-gon so that this leg is tangential to the outline of the circular output area of the first circular collimator. Each second part is associated with one of the apices and is comprised in a second sector of the second circular collimator, approximately circumscribed around the n-gon so that the outline of the output area of this second circular collimator passes through the apex.

12 Claims, 5 Drawing Sheets

(51) Int. Cl.
  *F21S 41/24*   (2018.01)
  *F21S 43/249*   (2018.01)
  *G02B 3/08*   (2006.01)
  *F21S 41/265*   (2018.01)
  *F21S 43/14*   (2018.01)
  *F21W 102/00*   (2018.01)
  *F21Y 115/10*   (2016.01)

(52) U.S. Cl.
  CPC ........... *F21S 43/239* (2018.01); *F21S 43/249* (2018.01); *G02B 3/08* (2013.01); *G02B 19/0019* (2013.01); *F21S 43/14* (2018.01); *F21W 2102/00* (2018.01); *F21Y 2115/10* (2016.08)

(56) References Cited

U.S. PATENT DOCUMENTS

| | | | |
|---|---|---|---|
| 8,740,427 B2* | 6/2014 | Fritz | B60Q 1/2665 |
| | | | 362/494 |
| 10,386,035 B2* | 8/2019 | Rabek | F21S 43/249 |
| 2007/0064431 A1 | 3/2007 | Fallahi et al. | |
| 2008/0062686 A1* | 3/2008 | Hoelen | G02B 6/002 |
| | | | 362/240 |
| 2009/0207610 A1* | 8/2009 | Sayers | F21S 43/249 |
| | | | 362/247 |
| 2014/0268723 A1* | 9/2014 | Stein | F21S 43/315 |
| | | | 362/218 |
| 2016/0201867 A1 | 7/2016 | Moser et al. | |
| 2016/0334074 A1 | 11/2016 | Fukui et al. | |
| 2018/0149333 A1* | 5/2018 | Kumar | F21S 41/275 |
| 2019/0003685 A1* | 1/2019 | Dross | F21V 7/0091 |

* cited by examiner

COLLIMATOR, ESPECIALLY FOR THE LIGHT DEVICE OF A VEHICLE, AND AN OPTICAL MODULE COMPRISING THE COLLIMATOR

RELATED APPLICATION

This application claims the priority benefit of Czech Patent Application Serial No. PV 2017-783, entitled "A collimator, especially for the light device of a vehicle, and an optical module comprising the collimator", the entire disclosure of which is incorporated herein by reference.

FIELD OF THE INVENTION

The invention relates to a collimator, especially for the light device of a vehicle, and an optical module comprising this collimator.

BACKGROUND INFORMATION

The document U.S. Pat. No. 7,207,700B2 describes the design of a collimator where a rectangular sector is inserted leading across a lens, the band being replaced with a calculated sector that controls diffusion horizontally and collimates vertically. The sector is surrounded by two parts of the collimator, the resulting standard circular shape of the collimator not being considered. A disadvantage of this design is that the collimator does not solve the issue of geometry and the related appearance of the light image in the lit up state.

The document US2016334074 describes the design of an optical collimator intended primarily for the daytime running light (DRL) function. The document deals with the issue of positioning the optical device in a vehicle, e.g., in a situation where the device does not directly light in the driving direction of the vehicle and the optical device is positioned, e.g., diagonally. The document does not deal with the geometrical problem—i.e. the circular versus the n-gonal shape. The disclosed collimator has a central lens surrounded by two types of lenses—lenses of one type are arranged in the direction of the curved line where the LED sources are situated, lenses of the other type are arranged in the perpendicular direction. The input and output areas of the lenses are exactly calculated—they have a certain curvature within a particular range.

The object of the present invention is to propose a collimator, especially for a light device of a vehicle, solving the geometrical difference between a circular collimator and an n-gon while maintaining high efficiency and a homogeneous appearance. The collimator is especially designed for a signal light function as, e.g., the daytime running light or position light and the stop/turn indicator function.

SUMMARY OF THE INVENTION

The above-mentioned drawbacks of the prior art are eliminated or at least considerably reduced by a collimator, especially for the light device of a vehicle, according to the invention, that has an output area approximately having the shape of an n-gon that has apices and legs, for collimation of light rays emitted by a light source associated with the collimator. In a view of the collimator from the side from the optical source in the direction of the lighting axis of the collimator, the collimator comprises n first parts and n second parts. Each first part is associated with one of the legs of the n-gon and comprises the first sector of the first circular collimator, approximately inscribed in the n-gon in such a way that this leg is tangential to the outline of the circular output area of the first circular collimator, wherein this first sector is delimited between two planes perpendicular to the circular output area passing through the center of the circular output area and intersecting the leg. Each second part is associated with one of the apices and is comprised in a second sector of the second circular collimator, approximately circumscribed around the n-gon in such a way that the outline of the output area of this second circular collimator passes through the apex, wherein this second sector is delimited between two planes each of which delimits the adjacent first sector from one side at the same time.

In one of the embodiments, the n-gon is a regular n-gon, the first circular collimators associated with the legs are identical, the second circular collimators associated with all the apices are identical, and the output areas of the first circular collimators and the second circular collimators have a common center.

In another one of the embodiments, each second part is formed by the respective second sector trimmed by two planes perpendicular to the output area of the collimator in such a way that the output area can be delimited by parts of two legs of the n-gon leading from the apex that is included in this second sector, instead of a part of the outline of the output area of the respective second circular collimator.

In another one of the embodiments, each first part formed by the respective first sector is supplemented with material that the collimator is made of in such a way that the output area is delimited by a part of the side of the n-gon that this first part is associated with, instead of a part of the outline of the circular output area of the first circular collimator.

In another one of the embodiments, the n-gon is a square.

The collimator can comprise a lens situated in such a way that its longitudinal axis coincides with the lighting axis of the collimator.

The collimator can be produced as one integral part, especially plastic molding.

Another object of the invention is an optical module, especially for a vehicle, comprising the above-described collimator and a light guide to conduct rays collimated by the collimator associated with the light guide.

The collimator can be connected to the light guide while it can form one integral piece together with the light guide, especially a plastic molding.

Alternatively, the collimator can be situated at a distance opposite the input area of the light guide, which is part of the surface of the light guide, designed to bind optical rays collimated by the collimator to the light guide.

In one of the embodiments of the optical module, the light guide has a plate-like shape and the optical module comprises several square collimators situated next to each other, whose leg has a size that is the size of the height of the rectangular input area of the light guide at the same time.

BRIEF DESCRIPTION OF THE DRAWINGS

The present invention will be clarified in a more detailed way with the use of its preferred embodiments with references to attached drawings, where.

EXAMPLES OF EMBODIMENTS OF THE INVENTION

FIGS. 1 to 9 shows the first embodiment example of a collimator 1 according to the invention—collimator 1 with a square output area 2, which is hereinafter also referred to as the "square collimator 1".

The square collimator 1 can be used for example for the daytime running/positional lighting, or for braking/directional indicator applications, as well as for various optical principles where it is desirable to bind light from the collimator to square or rectangular input areas.

The need to propose a modeling and calculation method of a square collimator primarily ensues from the goal to eliminate the drawback of the geometrical deficiency which occurs when a circular collimator (i.e. collimator with a circular output area) is used to emit rays to a square or rectangular input area, e.g., a light guide. Conversely, using a square collimator for a square input area (or more square collimators next to each other for a rectangular input area) will eliminate the said geometrical deficiency.

Figure 1:
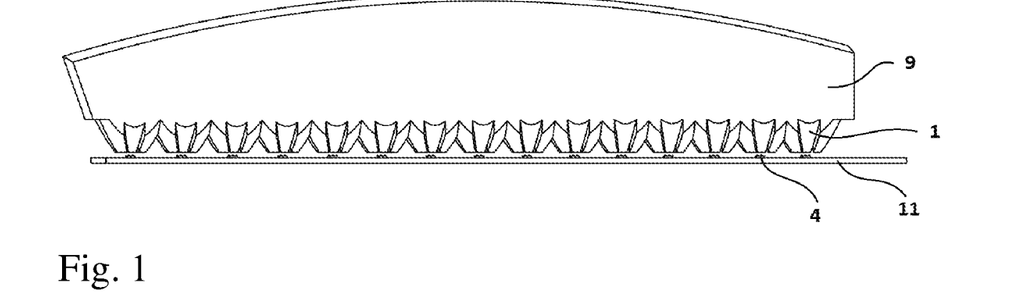
FIG. 1 shows a perspective view of an embodiment example of an optical module according to the invention, comprising an embodiment example of a collimator according to the invention.
Figure 2:
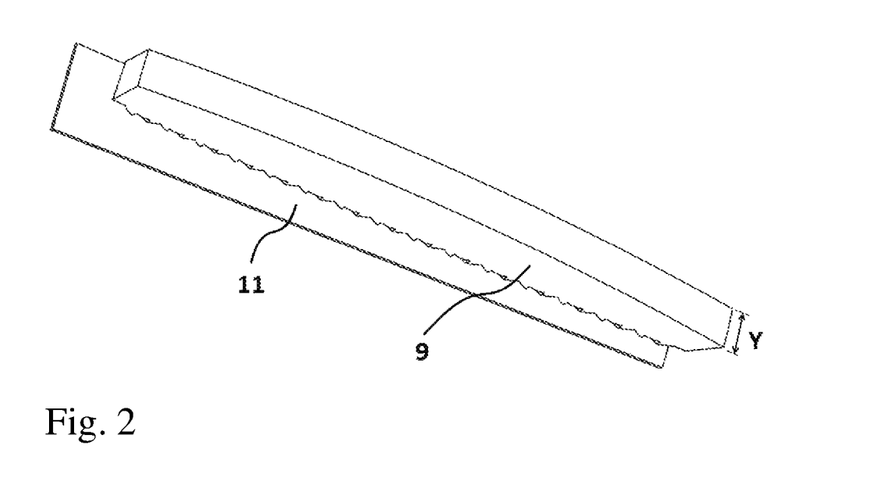
FIG. 2 shows a front view of the optical module of FIG. 1.
Figure 3:
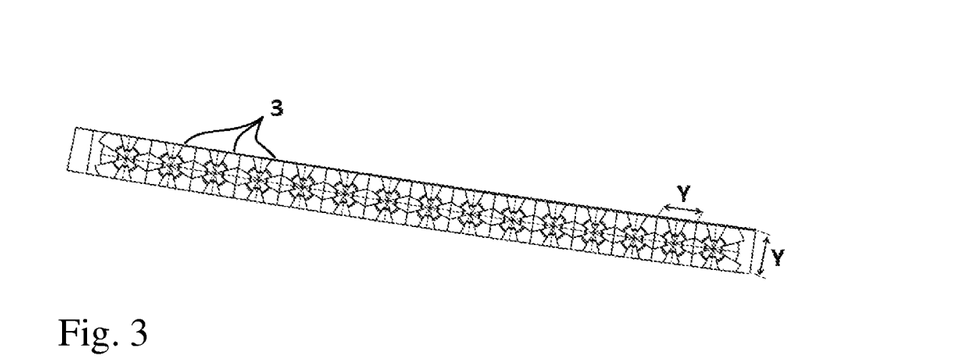
FIG. 3 shows a rear view (i.e. from the side of the light sources, which are not shown here) of the square collimators (i.e. collimators with a square output area), used in the optical module of FIG. 1.
Figure 4:
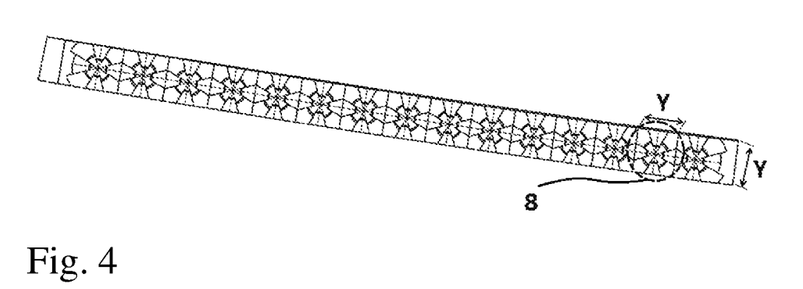
FIG. 4 shows a view corresponding to the view shown in FIG. 3 with an indication of the perimeter of the output area of the circumscribed circular collimator (this collimator is circumscribed around the square output area of the modeled resulting square collimator)
Figure 5:
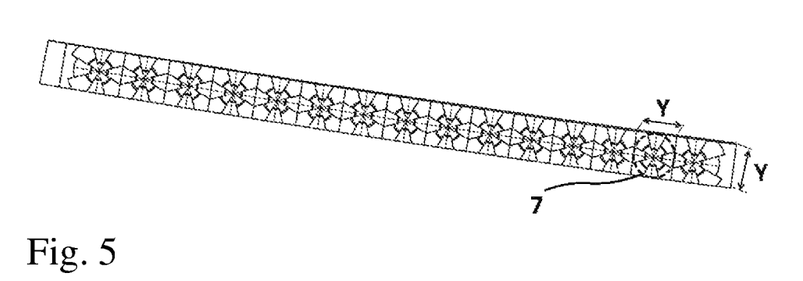
FIG. 5 shows a view corresponding to the view shown in FIG. 3 with an indication of the perimeter of the output area of the inscribed circular collimator (this collimator is inscribed in the square output surface of the modeled resulting square collimator)
Figure 6:
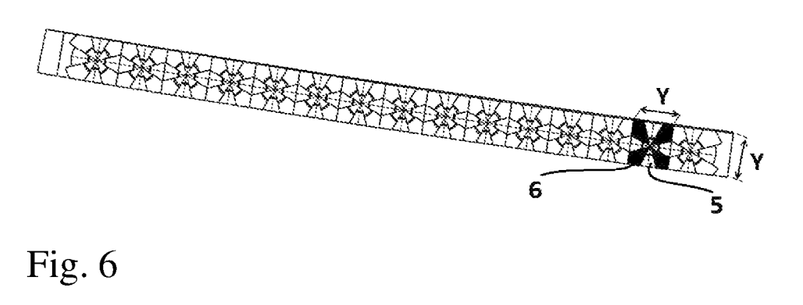
FIG. 6 shows a view corresponding to the view shown in FIG. 3, indicating the first parts and second parts included in the resulting modeled square collimator made up of sectors of the imaginary circumscribed and inscribed circular collimator.
Figure 7:
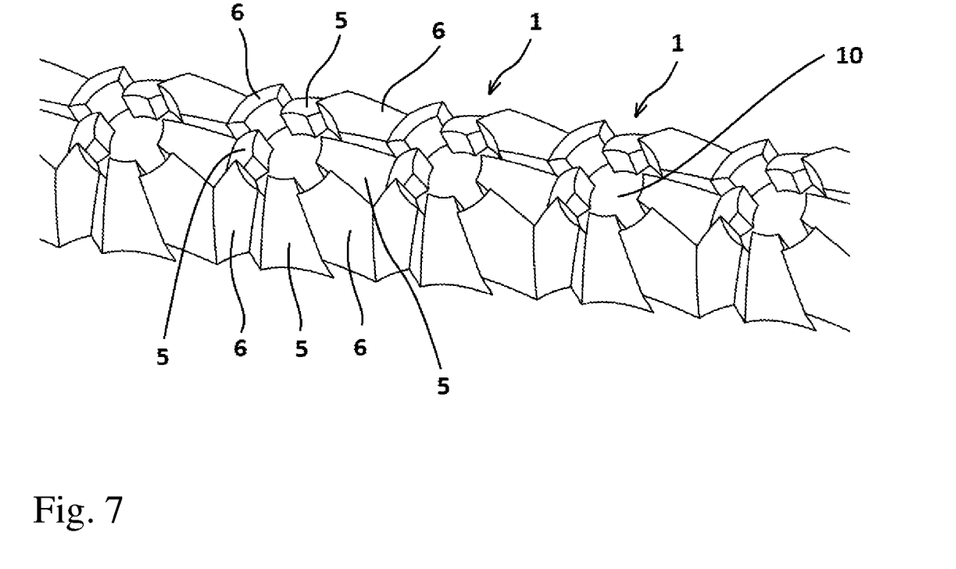
FIG. 7 shows a perspective view from the side of the optical sources, which are not shown here, of the row of the resulting modeled square collimators arranged next to each other, used in the optical module of FIG. 1.
Figure 8:
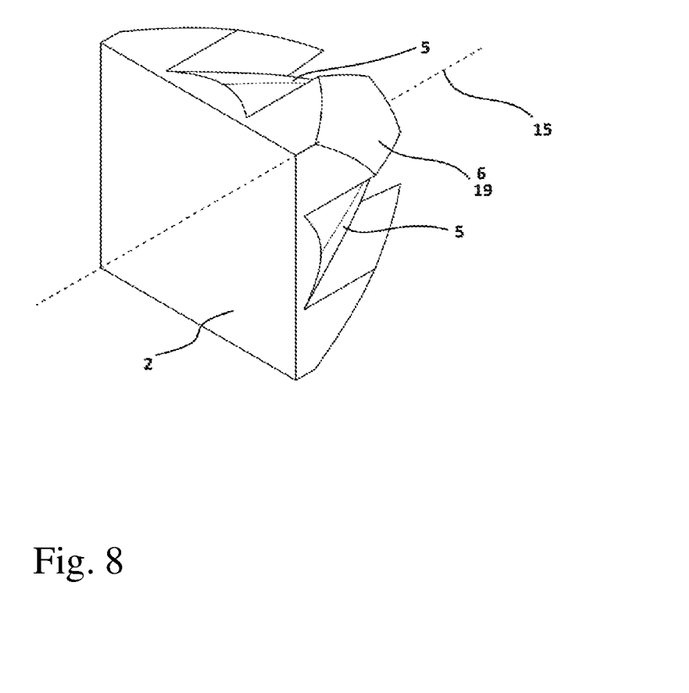
FIG. 8 shows a view of a single collimator as shown in FIG. 7, in the direction from the output area to the light source, which is not shown here.

FIG. 1 shows a geometrical module according to the invention wherein a planar light guide 9, a PCB 11 carrying light sources 4, preferably LED sources, and square collimators 1 modeled according to this invention are used. The collimators 1 are situated next to each other and are connected to the light guide 9 (they are preferably made as one integral piece with the light guide 9, e.g., using the injection molding technique), which has a height or thickness Y in the place of connection to the collimators, which is equal to the length of a leg 18 of the square output area 2 of the collimators 1.

For the purposes of this invention, the output area of the collimator refers to the region where collimated light rays exit the collimator. On the other hand, an input area is an area, e.g., an area of the light guide designed to transfer light rays into the light guide. Thus, in one of the possible embodiments of the optical module (not shown in the drawings), the input area may be arranged at a distance from the collimator and it is the surface of the light guide against which the collimator is situated with its output area, or if the collimator is part of the light guide (e.g., forms an integral part with the light guide), the input area is an inner planar region (i.e. not a surface) of the light guide where the output of the collimator leads.

An imaginary square 3 on the rear side of the light guide 9 belongs to each collimator 1, while the collimator 1 should be modeled into this square 3.

Several options of modeling a collimator into a square are known from the prior art. The first such known option is that the collimator is modeled larger in such a way that the outline of its circular output area circumscribes the said square—i.e. the diameter of the collimator corresponds to the diagonal of the imaginary square. The collimator is subsequently "trimmed" to the shape of the said square. A disadvantage of this standard solution is lower efficiency of the resulting collimator, its advantage being that it does not exhibit the above-mentioned geometrical deficiency.

Another option known from the prior art is that a circular collimator is modeled for the said square input area of the light guide that is inscribed with its circular output area in the said square, so the diameter of the circular collimator corresponds to the length of a side of the square. A collimator modeled this way does not lose any efficiency because there is no "trim", but in the corners of the imaginary square of the input area of the light guide there are places of non-homogeneity because these regions are not "covered" by the resulting circular collimators designed according to this method.

Further, the spatial arrangement/embodiment of the square collimator 1 according to the present invention will be described as well as how to obtain this arrangement. The spatial arrangement of the collimator 1 according to the invention combines in itself some elements of both the above-mentioned options of producing a collimator known from the prior art. However, compared to the prior art, the collimator 1 does not exhibit any geometrical deficiency, and it shows higher luminous efficiency than collimators modeled according to the above-mentioned first option and slightly lower efficiency compared to collimator modeled according to the above-mentioned second option.

Figure 9:
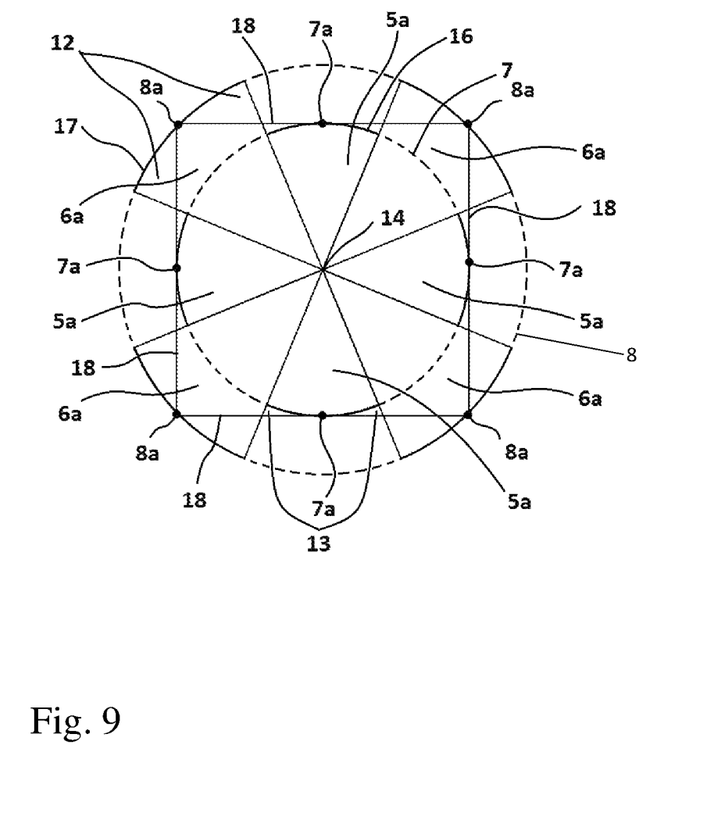
FIG. 9 shows a schematic representation of the outline of the square output area of the resulting modeled square collimator and the outlines of the output area of the imaginary circumscribed circular collimator and imaginary inscribed circular collimator and the sectors from these imaginary circular collimators used to model the square collimator.

The principle of the modeling of a collimator, according to the present invention, see, e.g., FIG. 9, is that initially, the first circular collimator of such a size is considered that the outline 7 of its circular output area is inscribed in the square 3 that corresponds to the square input area, e.g., the input area of the light guide. Four first sectors 5a are obtained from this first circular collimator that include contact points 7a, but do not include any of the apices 8a of the square 3. Further, the second circular collimator of such a size is considered that the outline 8 of its circular output area is circumscribed around a square 3. Four second sectors 6a are obtained from this second circular collimator, each of the second sectors 6a comprising one apex 8a and not comprising any of the contact points 7a, while the boundaries of each of the second sectors 6a formed by straight lines leading from the center 14 are also boundaries delimiting the adjacent first sectors 5a from one side. The collimator 1 according to the invention then comprises eight parts, which are the first sectors 5a and the second sectors 6a having their apices in the center 14, which are situated alternately next to each other in mutual contact. The center 14 refers to the center of the circular output area of the imaginary first circular collimator, which coincides with the center of the circular output area of the imaginary second circular collimator.

In one embodiment of the collimator 1 according to the invention, the second parts 6 are not the whole second sectors 6a, but the second sectors 6a "trimmed" by two planes perpendicular to the plane of the output area 2 of the collimator in such a way that the outline of the second parts 6 is formed by line segments corresponding to parts of the legs 18 of the square 3 (generally n-gon 3—see below) leading from the apices 8a at their outer end instead of the arch 17, so the second parts 6 do not comprise the regions 12 (FIG. 9).

Similarly, in another preferred embodiment of the collimator 1 according to the invention, the first parts 5 are formed by the first sectors 5a "supplemented" at their outer ends with material (especially plastic) that the collimator 1 is made of in such a way that the outline of the first parts 5 is terminated by a line segment corresponding to a part of the leg 18 of the square 3 instead of the arch 16, so the first parts 5 then extend into the regions 13 (FIG. 9).

The above-mentioned "trimming" or "supplementing" of material is meant metaphorically, as in fact there is no "trimming" or "supplementing" in reality, but the shape and dimensions of the collimator are calculated in such a way to achieve the described required resulting spatial design of the collimator 1 in the noted embodiments.

The collimator 1 according to the invention can be produced as one integral piece, e.g., using the injection molding technique.

One of advantages of a collimator 1 according to the invention is that diffusion can be tuned separately in each sector 5a, 6a. The detailed view also shows that the reflective areas 19 of the collimator 1 are offset while the collimating lens 10, which can be used in the collimator 1, is not offset. This results from the fact that the first circular collimator, i.e. the inscribed circular collimator, and the second circular collimator, i.e. the circumscribed circular collimator, are calculated in such a way that they have the same central lens 10, whereas the reflective areas 19 are just the areas that cover the corners of the imaginary square 3 helping to give the circular collimator a square shape.

A collimator 1 that should have an output area 2 generally having the shape of a regular n-gon 3 has an analogous spatial design. In this case, the modeling of the collimator 1 is also based on one imaginary circumscribed and one inscribed collimator. N second sectors 6a are obtained from the circumscribed collimator and n first sectors 5a are obtained from the inscribed collimator as well, while the resulting modeled collimator 1 with the output area 2 having the shape of a regular n-gon comprises 2×n parts 5, 6 corresponding to the first sectors 5a and second sectors 6a positioned alternately next to each other that are adapted as mentioned above (the first parts 5 are the first sectors 5a "supplemented with material", and the second parts 6 are "trimmed" second sectors 6a as mentioned above).

However, the invention also generally relates to a collimator 1 with an output area 2 having the shape of a general n-gon comprising both regular and irregular n-gons. In practice, it is suitable for the collimator according to the invention to have a shape of such an irregular n-gon wherein the center 14 can be selected, as described below, using the method described below (these are generally n-gons that are irregular on the one hand, but whose shape is not so complicated that implementation of a collimator with this shape of the output area would not be practicable or economical anyway).

As the center 14 of the irregular n-gon 3, such an inner point of the n-gon 3 can be selected that is the common center of all the circular output areas of the above-mentioned imaginary first circular collimators whose outlines 7 the respective legs 18 of the n-gon are tangential to, and that is the common center of all the circular output areas of the above-mentioned imaginary second circular collimators whose outlines 8 pass through the respective apices 8a of the n-gon.

Figure 10:
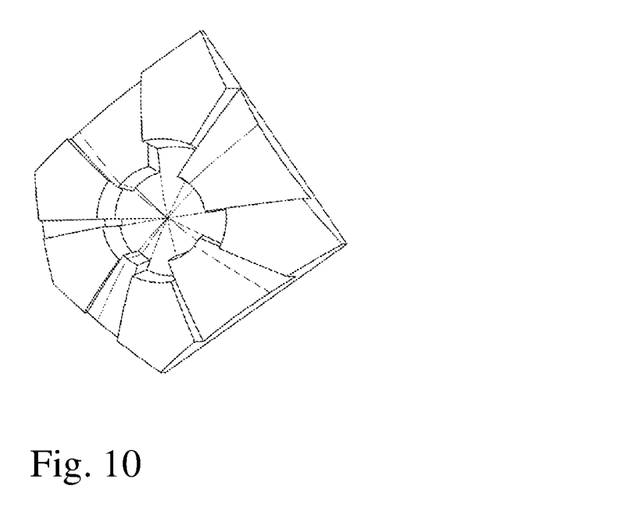
FIG. 10 shows a perspective view of another embodiment example of the resulting modeled collimator according to the invention, which has an output area having the shape of an irregular pentagon.
Figure 11:
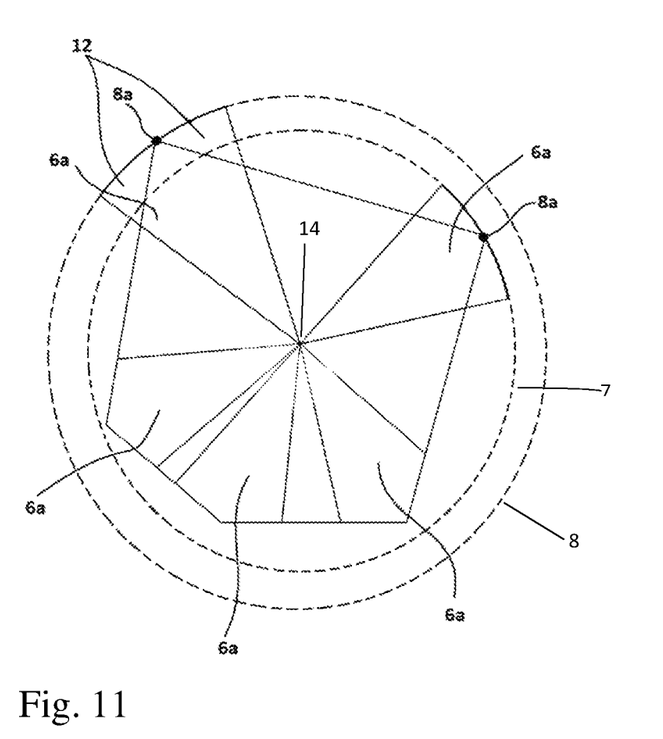
FIG. 11 shows a schematic representation of the outline of the output area having the shape of an irregular pentagon of the resulting modeled collimator (hereinafter also the "pentagonal collimator") of FIG. 10 and the outlines of the output areas of two imaginary circular collimators passing respectively through two apices of the pentagon and the respective two sectors from these two circular collimators that are used to model the pentagonal collimator.
Figure 12:
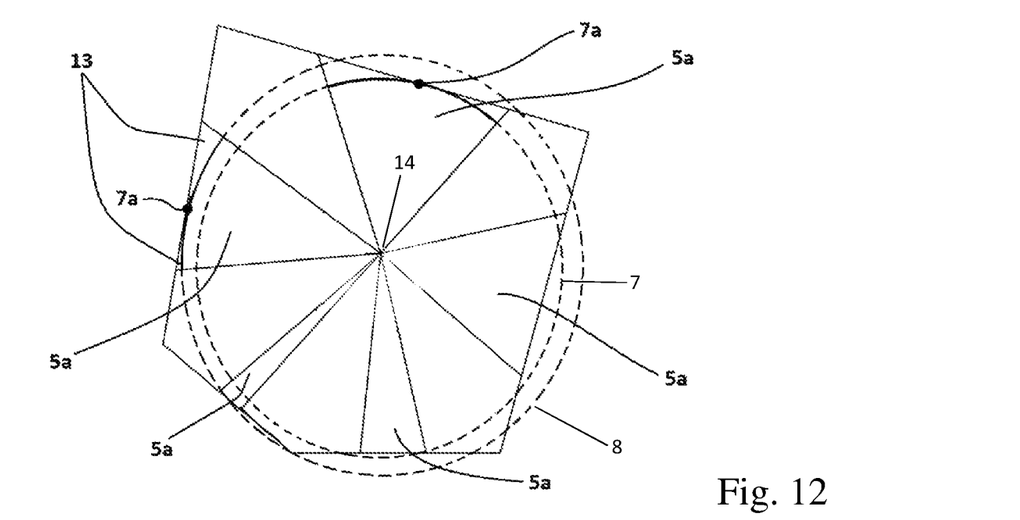
FIG. 12 shows a schematic representation of the outline of the output area having the shape of an irregular pentagon of the resulting modeled square collimator (hereinafter also the "pentagonal collimator") of FIG. 10 and the outlines of the output area of two imaginary circular collimators that two of the pentagon legs are tangential to and the respective two sectors from these two circular collimators that are used to model the pentagonal collimator.

Further, using an example with reference to FIGS. 10 to 12, an embodiment of the collimator 1 according to the invention—a collimator 1 with an output area 2 having the shape of an irregular pentagon 3 will be described.

Concerning a collimator 1 with an output area 2 having the shape of a general n-gon 3 that has apices 8a and legs 18, the modeling of the collimator is done in such a way that for each leg 18, the first circular collimator is modeled that has the first circular output area with a center 14 and outline 7 in such a way that the leg 18 is tangential to the outline 7 at the contact point 7a. Subsequently, the first sector 5a is obtained from this first circular collimator delimited between two straight lines passing through the center 14 and comprising the contact point 7a, while none of the apices 8a is found between these straight lines. Further, for each apex 8a, the second circular collimator is modeled that has a circular output area with the center 14 and outline 8 passing through the apex 8a. Subsequently, from the second circular collimator the second sector 6a is obtained comprising the apex 8a and delimited by two straight lines each of which forms one of the boundaries of two adjacent first sectors 5a at the same time. In the resulting collimator 1, the first and second sectors 5a, 6a obtained this way are positioned alternately in contact next to each other, with their apices situated in the center 14 and with individual contact points 7a and apices 8a contained in the sectors 5a, 6a located in the same position as they had in the n-gon 3. In one embodiment, each second part 6 can be formed by the second sector 6a adapted in such a way to be terminated by parts of two legs 18 of the n-gon 3 leading from the apex 8a situated in this second sector 6a instead of the circular arch 17, and the first part 5 can be formed by the first sector 5a supplemented in such a way that the first part 5 is terminated by a part of the leg 18 of the n-gon 3 that passes through the contact point 7a comprised in this first sector 5a instead of the circular arch 16.

The above-mentioned facts indicate that for an irregular n-gon 3, the modeling of a collimator 1 will comprise creation of an imaginary circular collimator for each apex 8a ("circumscribed collimator") separated and for each contact point 7a ("inscribed collimator") also separately—tangentially to the respective leg 18 of the n-gon 3. FIGS. 11 and 12 indicate two collimators, circumscribed and inscribed for the respective contact point 7a or apex 8a in each case. The number of inscribed as well as circumscribed collimators will always correspond to the number n of the n-gon. An irregular n-gon will increase laboriousness of modeling of the collimator 1, because there must be more circumscribed and inscribed collimators because an inscribed collimator will always pass through just one apex 8a and the inscribed collimator will be tangential to just one leg 18 of the n-gon 3 at just one contact point 7a.

The resulting optical collimator 1 is made up of the first sectors 5a of inscribed, i.e. the first circular collimators, and circumscribed, i.e. the second circular collimators while just the sector 5a, 6a whose position corresponds to the position of the contact point 7a or apex 8a is taken from each inscribed or circumscribed circular collimator.

LIST OF REFERENCE MARKS

1—collimator
2—output area
3—square or n-gon
4—light source
5—first part
5a—first sector
6—second part
6a—second sector
7—outline (of the output area of the first circular collimator)
7a—contact point
8—outline (of the output area of the second circular collimator)
8a—apex (of the n-gon)
9—light guide
10—lens
11—PCB
12, 13—region
14—center
15—lighting axis
16, 17—circular arch
18—leg
19—reflective area
Y—height or thickness

The invention claimed is:

1. A collimator for a light device of a vehicle, the collimator comprising a non-planar light input area, a segmented lens region comprising a lens, and a planar light output area approximately having a shape of an n-gon with legs and apices, for collimation of light rays emitted by a light source associated with the collimator,
    wherein in a view of the collimator from a side from the light source in a direction of a lighting axis of the collimator, the collimator comprises n first parts and n second parts associated with the light input area,
    wherein each first part is associated with one of the legs of the n-gon and comprises a first sector of a first circular collimator, the first circular collimator being approximately inscribed in the n-gon, in such a way that this leg is tangential to an outline of a circular output area of the first circular collimator,
    wherein this first sector is delimited between two planes being perpendicular to the circular output area and passing through a center of the circular output area and intersecting the leg, and each second part is associated with one of the apices and comprises a second sector of a second circular collimator, the second circular collimator being approximately circumscribed around the n-gon, in such a way that an outline of an output area of this second circular collimator passes through at least one of the apices of the n-gon,
    wherein this second sector is delimited between two planes, each of which planes, at the same time, delimiting the adjacent first sector from one side, and
    wherein the segmented lens region is at least partially formed from the first parts and the second parts.

2. The collimator according to claim 1, wherein the said n-gon is a regular n-gon, the said first circular collimators associated with the legs are identical, the second circular collimators associated with all the apices are identical, and the output areas of the first circular collimators and the second circular collimators have a common center.

3. The collimator according to claim 1, wherein each second part is formed by the respective second sector trimmed by two planes perpendicular to the output area of the collimator in such a way that the output area is delimited, instead of by a part of the outline of the output area of the respective second circular collimator, by parts of two legs of the n-gon leading from the apex that is included in this second sector.

4. The collimator according to claim 1, wherein each first part is formed by the respective first sector supplemented with material that the collimator is made of in such a way that the output area is delimited, instead of by a part of the outline of the circular output area of the first circular collimator, by a part of the leg of the n-gon that this first part is associated with.

5. The collimator according to claim 2, wherein the n-gon is a square.

6. The collimator according to claim 1, wherein the lens is situated in such a way that its longitudinal axis coincides with the lighting axis of the collimator.

7. The collimator according to claim 1, wherein the collimator is produced as one integral part.

8. An optical module for a vehicle, comprising a collimator according to claim 1, wherein the optical module comprises a light guide to conduct rays collimated by the collimator associated with the light guide.

9. The optical module according to claim 8, wherein the collimator is connected to the light guide.

10. The optical module according to claim 9, wherein the collimator and the light guide form one integral part together.

11. The optical module according to claim 8, wherein the light guide has a plate-like shape and the optical module comprises a plurality of square collimators situated next to each other whose leg has a height (Y) substantially equal to a height of a rectangular input area of the light guide.

12. The collimator according to claim 1, wherein the lens comprises a round lens.

* * * * *